No. 657,967. Patented Sept. 18, 1900.
G. W. THOMPSON.
FARM GATE.
(Application filed Mar. 17, 1899.)
(No Model.)
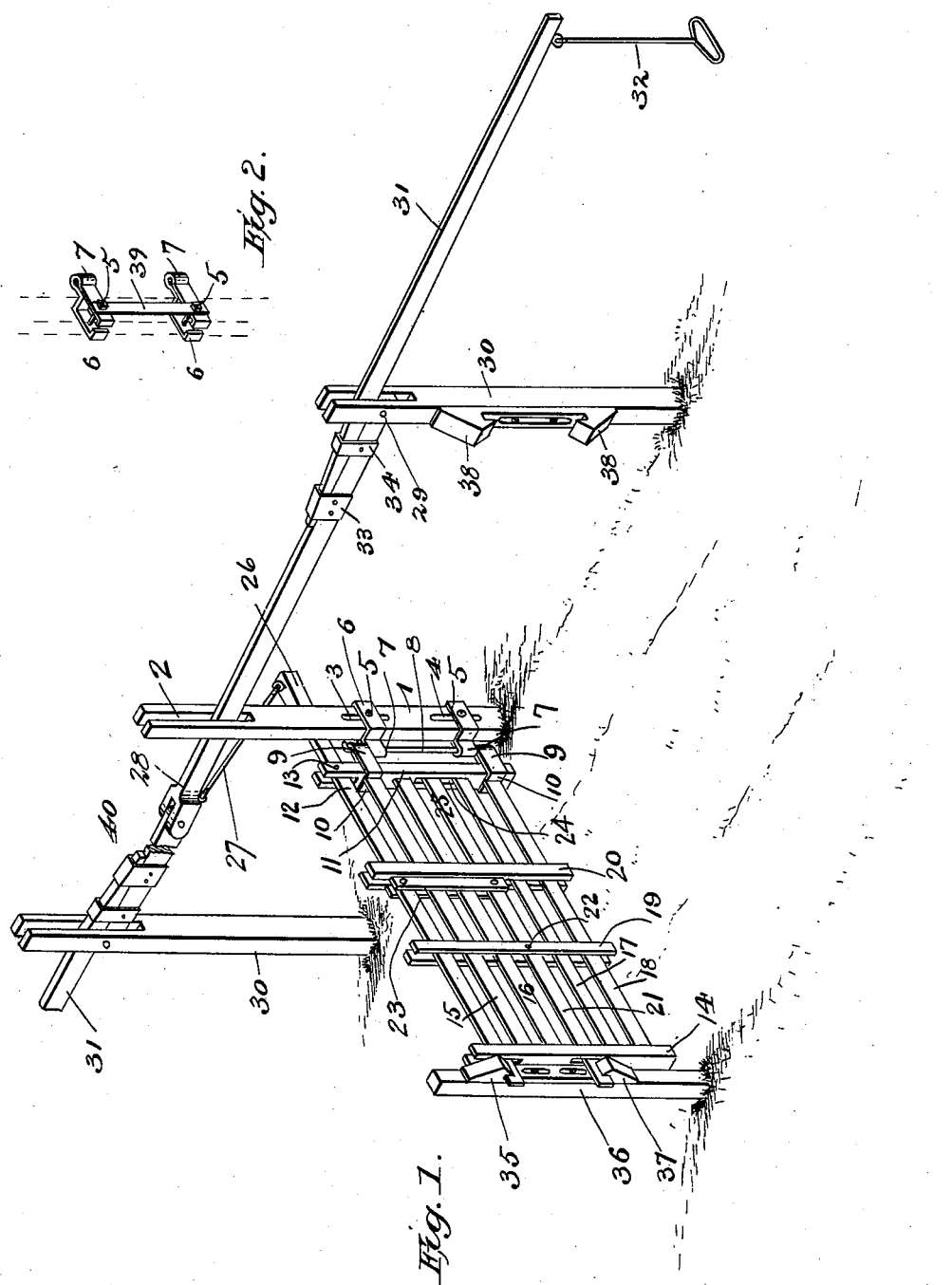
WITNESSES:
F. L. Ourand
J. D. C. Cole
INVENTOR
G. W. Thompson
BY
W. T. Fitzgerald
ATTORNEYS.

UNITED STATES PATENT OFFICE.

GEORGE W. THOMPSON, OF ENION, ILLINOIS.

FARM-GATE.

SPECIFICATION forming part of Letters Patent No. 657,967, dated September 18, 1900.

Application filed March 17, 1899. Serial No. 709,423. (No model.)

*To all whom it may concern:*

Be it known that I, GEORGE W. THOMPSON, a citizen of the United States, residing at Enion, in the county of Fulton and State of Illinois, have invented certain new and useful Improvements in Farm-Gates; and I do hereby declare the following to be a full, clear, and exact description of the invention, such as will enable others skilled in the art to which it appertains to make and use the same.

My invention, as will be hereinafter fully described and claimed, relates to certain new and useful improvements in the construction and combination of parts necessary to constitute a swinging gate, the main object being to afford means whereby said gate may be easily opened and promptly closed by the operator without the necessity of his dismounting from his horse or vehicle, as the case may be.

Other advantages and objects will be made fully apparent from the following specification and the accompanying drawings, in which—

Figure 1 shows a perspective view of my invention complete as applied to use, though showing one of the operating-levers broken away in order that a proper showing may be set forth of the other parts. Fig. 2 is a perspective detail of the preferred form of adjustable supports or hinges designed to hold the gate in its operative position.

Referring to the several parts of my invention and their coöperating accessories by designating-numerals, 1 is the supporting-post, which is constructed in substantially the usual manner, except that its upper end is bifurcated, thus providing the slotted opening 2, while below said slotted opening I form in said post the slotted apertures 3 and 4, through which I dispose the bolts 5, designed to hold the supporting members or hinges 6 in place, said hinges or members being snugly-fitting collars for the post 1, having eyes 7, adapted to receive the vertically-disposed bolt or rod 8, which, as will be seen by reference to the drawings, also passes through the extensions or ears 9, formed upon the collars 10, which latter extend entirely around the end upright 11 of the gate. The upper end of the upright 11 is bifurcated, and pivotally connected to said end is the upper bar 12 of the gate, held in position by the pivot or bolt 13. The upright 11 is supplemented by the upright 14 upon the opposite end of the gate, which also has a bifurcated upper end, designed to loosely receive the free end of the upper bar 12. The gate is completed by the addition of the stationary bars 15, 16, 17, and 18, which may be multiplied in number, as desired, in order to increase the height of the gate. The uprights are reinforced by the pair of cleats 19 and 20, one upon each side of the gate, firmly secured to said fixed bars, though freely receiving between them the pivoted upper bar 12 and the pivoted middle bar 21, which latter, as will be seen, is pivotally secured in position between the cleats 19 by the bolt 22 and is pivotally connected to the upper bar by the link section or member 23, a slotted opening 24 being formed in the upright 13, designed to loosely receive the inner end 25 of the bar 21.

The upper pivoted bar 12 is provided with the integral extension 26, the extreme end of which is pivotally connected by the link 27 to the inner end of the controlling-lever 28, which lever, it will be seen, passes loosely through the slotted opening 2 in the post 1 and extends into pivotal connection, by means of the bolt 29, with the auxiliary keeper-post 30, and it is clear that by properly connecting the operating-lever 31, provided with the operating-handle 32, to said controlling-lever 28 by means of the collars 33 and 34 or otherwise a downward pull upon the handle 32 will elevate the inner end of the controlling-lever 28 and incidentally raise the free end 26 of the bar 12, and thereby depress the free end of said bar and disengage the same from the keeper 35, secured to the post 36. It is further obvious that said downward movement of the free end of the bar 12 will so act upon the link 23 that it will force the inner end 25 of the bar 21 downward and incidentally elevate the free end of said bar, thereby disengaging it from the keeper 37, and as the movement of the bars 12 and 21 is simultaneous they will be disengaged from their keepers at the same instant, and thereby permit the gate to be swung around into engagement with the keepers 38. When a downward pull upon the operating-lever 32 is released, the weight of the inner end of the controlling-lever 28 will act upon the free end 26 of the upper bar 12 and depress the same, while elevating the free end of said bar, thus causing said bar to engage with its keeper upon the auxiliary post 30, and at the same instant the upward movement of said free end will cause the free end of the bar 21 to drop into engagement with its keeper, thereby insuring that the gate will be held locked in an open position, and that it cannot be again released until a downward pull is given upon the opposite lever or upon the same lever which secured the opening of the gate.

By reference to Fig. 2 it will be observed that the collars, which also comprise the eyes 7, are vertically adjustable upon the supporting-post 1 in order to compensate for any settling or sagging of the free end of the gate, thereby making it possible to readjust the entire gate by simply elevating said collars, when the same may be securely locked in position by the bolts 5, which extend loosely through the slotted apertures 3, it being understood that the free end of the bolt may be threaded into a suitable aperture provided in the opposite side of the collar, or a securing-nut may be disposed on said end, thus enabling a binding action to be set up by said bolt upon said post, the result being that the collars will be securely locked in an adjusted position. The collars are connected together by the bar or link 39 in order to insure that they will move simultaneously and may therefore be more readily and accurately adjusted. It will be observed that I have also made it possible to readily adjust the position of the keepers, inasmuch as the keepers proper, 35, 37, or 38, are preferably integrally formed with the intermediate or body section 40, which is provided with a vertical slot or slots 41, adapted to receive the locking-bolts 42, by means of which said body-section may be secured at any desired point upon the keeper-post, and it is therefore plain that the sagging or settling of the end of the gate may be compensated for by readjustment of the keepers or by a readjustment of the collars, as preferred, or a compensating adjustment of both parts may be made.

After my improved gate and the several cooperating parts thereof are properly assembled in their respective operative positions it is obvious that a simple pull upon one of the levers 32, there being one for each of the levers 31, (both of said levers being pivotally connected to the controlling-lever 28, as shown,) will result in depressing the free end of the bar 12 and the simultaneous elevation of the free end of the bar 21, disengaging said ends from their keepers 35 and 37, respectively, and causing the gate to be swung into engagement with the auxiliary keeper-post 30 and the keepers carried thereon. The link 27 is so disposed that it will extend from the end of the extension 26 obliquely toward the bifurcated end of the controlling-lever 28, in which the connecting-section 40 is pivotally secured, and the tendency will therefore be to swing the gate in an open position when an upward pull is given to said link. There will be seen to be two auxiliary posts, both being designated by the numeral 30, their office being to give a pivotal support to the controlling-levers, as will be obvious by reference to the drawings.

Having thus fully described the construction and operation of my improved gate, I will dispense with further reference to the details thereof.

Having thus fully described my invention, what I claim as new, and desire to secure by Letters Patent, is—

1. The herein-described lever-controlled gate comprising an upper pivoted bar having an inward extension, in combination with an intermediate pivoted bar pivotally connected to said upper bar, said upper and intermediate bars being respectively pivoted near the hinge and latch end of the gate-frame whereby when an upward pull upon said extension of the upper bar is made the free end of said bars will be simultaneously drawn toward each other, thereby permitting said ends to be received by the keeper and will automatically separate from each other when said extension is released, as specified and for the purpose set forth.

2. A gate comprising an upper and an intermediate pivoted bar, the former having its pivot-point near the hinged portion of the gate while the latter bar is pivoted near the outer end of the gate; an inwardly-directed extension formed upon the upper bar, a controlling-lever and means to connect said lever with said extension, and a link located intermediate the pivot-points of said bars and pivotally connected to each bar, whereby an upward pull upon said extension will simultaneously draw the free outer ends of said pivoted bars toward each other in the manner specified and for the purpose set forth.

In testimony whereof I affix my signature in presence of two witnesses.

GEORGE W. THOMPSON.

Witnesses:
BERTHA G. PARR,
C. S. THOMPSON.